United States Patent
Robertson

(10) Patent No.: US 9,709,438 B2
(45) Date of Patent: Jul. 18, 2017

(54) BEAM PROFILER

(71) Applicant: M SQUARED LASERS LIMITED, Glasgow (GB)

(72) Inventor: Gordon Robertson, Glasgow Strathclyde (GB)

(73) Assignee: M SQUARED LASERS LIMITED, Glasgow (GB)

( * ) Notice: Subject to any disclaimer, the term of this patent is extended or adjusted under 35 U.S.C. 154(b) by 29 days.

(21) Appl. No.: 14/442,174

(22) PCT Filed: Nov. 13, 2013

(86) PCT No.: PCT/GB2013/052991
§ 371 (c)(1),
(2) Date: May 12, 2015

(87) PCT Pub. No.: WO2014/076473
PCT Pub. Date: May 22, 2014

(65) Prior Publication Data
US 2016/0290861 A1 Oct. 6, 2016

(30) Foreign Application Priority Data
Nov. 13, 2012 (GB) .................................. 1220416.0

(51) Int. Cl.
*G01J 1/00* (2006.01)
*G01J 1/42* (2006.01)
*G01J 1/04* (2006.01)

(52) U.S. Cl.
CPC ........... *G01J 1/4257* (2013.01); *G01J 1/0411* (2013.01); *G01J 2001/4261* (2013.01)

(58) Field of Classification Search
CPC ....... G01J 1/0437; G01J 1/0444; G01J 1/4257
USPC .................. 250/216, 232; 356/121, 124, 222
See application file for complete search history.

(56) References Cited

U.S. PATENT DOCUMENTS

| | | | |
|---|---|---|---|
| 3,617,755 A | 11/1971 | Arnaud | |
| 5,064,284 A * | 11/1991 | Johnston, Jr. | G01J 1/4257 356/121 |
| 5,214,485 A | 5/1993 | Sasnett et al. | |
| 6,313,910 B1 | 11/2001 | Garvey et al. | |

(Continued)

OTHER PUBLICATIONS

Roundy, "Current Technology of Laser Beam Profile Measurements," Spiricon, Inc., 1995, (http://aries.ucsd.edu/LMI/TUTORIALS/profile-tutorial.pdf).

*Primary Examiner* — Kevin Pyo
(74) *Attorney, Agent, or Firm* — Nixon & Vanderhye P.C.

(57) ABSTRACT

An $M^2$ value beam profiling apparatus and method is described. The $M^2$ value beam profiler comprises an optical axis defined by a focussing lens assembly and a detector, wherein the focussing lens acts to create an artificial waist within an optical field propagating along the optical axis. The beam profiler also comprises a multiple blade assembly having a first set of blades located at an artificial waist position and a second set of blades longitudinally separated along the optical axis from the artificial waist position. The multiple blade assembly therefore provides a means for selectively passing the blades through the location of the optical axis. Employing these measured widths allows for the $M^2$ value of the optical field to be determined.

16 Claims, 9 Drawing Sheets

(56) References Cited

U.S. PATENT DOCUMENTS

2009/0051902 A1* 2/2009 Widen ................. G01J 1/4257
356/73
2014/0285877 A1* 9/2014 Kirshner ............ G02B 27/0927
359/350

* cited by examiner

BEAM PROFILER

This application is the U.S. national phase of International Application No. PCT/GB2013/052991 filed 13 Nov. 2013 which designated the U.S. and claims priority to United Kingdom Application No. 1220416.0 filed 13 Nov. 2012, the entire contents of each of which are hereby incorporated by reference.

The present invention relates to the field of optics. More specifically, the present invention concerns an apparatus and method for measuring the beam profile of the output field of a laser and in particular the $M^2$ value of the output field.

There are many applications of lasers in which the beam profile of its output field is of critical importance. With these applications it is usually necessary to measure the beam profile to ensure that a desired profile is present. For some lasers, and their applications, this may only be necessary during the initial design or fabrication phase of the laser. However, in other cases it may be necessary to monitor the beam profile of the output field continuously during the operation of the laser.

The beam profile of the output field is significant because it directly affects the energy density, the concentration, and the collimation of the output field. Furthermore, the propagation of the output field through space is significantly affected by the beam profile. It is known to those skilled in the art that the output field of a laser can comprise a variety of beam profiles, a Gaussian beam profile or "top hat" beam profile being two such examples. The Gaussian beam profile is perhaps the most common profile required since it allows for the highest concentration of focused light, whereas a flat top beam allows for very uniform distribution of the energy across a given area.

In practice, the output field of a laser rarely exhibits a uniform irradiance profile. For example it is not uncommon for Gaussian beam profiles to be highly structured. The significance of a distorted or non-uniform beam profile varies with the application. In many applications nonlinear processes are typically proportional to the irradiance of the output field squared or cubed. Thus a non-uniform Gaussian profile may have a peak energy that is significantly lower than that provided by a corresponding uniform Gaussian beam profile under the same conditions of total power or energy. As a result, the desired nonlinear process may be significantly weaker than that predicted theoretically.

It has therefore become increasing important to be able to characterise the quality of the output field of a laser. A summary of some of the known apparatus and techniques employed to profile such output fields is provided in a paper by Roundy, Carlos B. "*Current technology of laser beam profile measurements*" available on: http://aries.ucsd.edu/LMI/TUTORIALS/profile-tutorial.pdf (1995).

One of the most useful beam profile parameters known to those skilled in the art for characterising the quality of an output field of a laser is its $M^2$ value. In many applications, especially those in which a Gaussian beam is the desired profile, the $M^2$ value is in fact the most important characteristic for describing the quality of the beam. Indeed International Standard, ISO 11146-2:2005, specifies the $M^2$ value as the fundamental quality parameter for an output field of a laser.

To help illustrate the concept of the $M^2$ value FIG. 1 presents a schematic illustration of the propagation through a lens 1, of a first output field 2, having a uniform Gaussian profile i.e. one operating at the fundamental transverse mode or $TEM_{00}$ mode and a second output field 3 having an non-uniform Gaussian profile i.e. one composed of modes other than the fundamental transverse mode.

If the output beam of the laser has a beam width of W as it reaches the lens 1 then the focused spot size of a uniform Gaussian profile 2, $d_{00}$, is defined by the following equation:

$$d_{00} = 4\lambda f/\pi W \quad (1)$$

where $\lambda$ represents the wavelength of the output field 2 and f the focal length of the lens 1. For a non-uniform Gaussian profile 3 the focused spot size $d_0$ is defined by the following equation:

$$d_0 = M4\lambda f/\pi W \quad (2)$$

In practice, the output field 3 on the non-uniform Gaussian profile focuses to a larger spot size, namely M times larger than the focused spot size the uniform Gaussian profile, $d_{00}$.

In addition to defining the minimum spot size, the $M^2$ value also predicts the divergence of the output field after the focus plane. Specifically, the non-uniform Gaussian profile 3 will diverge M times faster than an equivalent $TEM_{00}$ field 2 of the same width. It will be appreciated by those skilled in the art that although FIG. 1 illustrates the situation where the output fields 2 and 3 propagate through a focusing lens 1 the same principles apply if no lens is present i.e. the field with non-uniform Gaussian profile 3 will diverge more rapidly by a factor of M than if it were true $TEM_{00}$ field 2.

Measuring the $M^2$ value is not a simple process since it cannot be found by measuring the output field width W at any single point. Theoretically, the $M^2$ value can be calculated by taking a first measurement of the width $W_1$ of the output field 3 at the beam waist so as to obtain the waist diameter $d_0$ and a second measurement $W_2$ in the far field so as to obtain a value for the divergence of the output field 3. These two values $W_1$ and $W_2$ can then be used to calculate the $M^2$ value. In practice it is found that using just these two measured values does not provide a particularly accurate calculation of the $M^2$ value.

A further complication arises from the fact that there exist at least five definitions of measured beam width $d_0$ employed by those skilled in the art, namely D4σ, 10/90 or 20/80 knife-edge, $1/e^2$, full width half maximum (FWHM), and D86 values. The accuracy between measurements therefore requires consistency between which definition of the beam width is employed.

In order to address these issues of accuracy the ISO standard has adopted the D4σ definition as the standard definition for the beam width value $d_0$. The $M^2$ value of the output field of a laser 3 is then determined experimentally by employing the following methodology:

1. Measure the D4σ widths at five axial positions near the beam waist $d_0$;
2. Measure the D4σ widths at five axial positions at least one Rayleigh length away from the waist position, $z_0$.
3. Fitting the ten measured data points to the following equation $$\sigma^2(z) = \sigma_0^2 + M^4 \left(\frac{\lambda}{n\sigma_0}\right)^2 (z - z_0)^2 \quad (3)$$

where $\sigma^2(z)$ represents the D4σ beam width.

Fitting the measured data points to equation (3) allows for the accurate calculations of the $M^2$, $z_0$ and $\sigma_0$ values to be made.

A schematic representation of a beam profiler 4 known in the art is presented in FIG. 2. This beam profiler 4 design comprises a rotating drum 5 containing a knife-edge, slit, or pinhole 6 that moves in front of a single element detector 7. Optically coupled on the opposite side of the rotating drum 5 to the detector 7 is an automated focusing lens assembly 8. During operation the focusing lens assembly 8 is initially employed to place the internal focused beam waist $d_0$ of an incident laser output field 3 at the centre of the rotating drum 5. It can be seen that the beam profiler 4 of FIG. 2 has two knife edges 6a and 6b oriented at 90° to each other such that when the rotating drum 5 spins, the knife edges 6a and 6b rapidly scan the incident laser output field 3 in orthogonal directions. The transmitted light is then measured by the detector 7 before the detected signal data is sent to a computer (not shown) which derives the beam profile both axis perpendicular to the optical axis 9 of the profiler 4. By scanning the focusing lens assembly 8 along the direction of the optical axis 9 the beam profiles at multiple planes can be recorded thus allowing the $M^2$ value for the output field of the laser 3 to be derived.

The beam profiler 4 of FIG. 2 exhibits a number of practical disadvantages. In the first instance the employment of the automated focusing lens assembly 8 means that it can take up to a minute to perform a scan and thus derive the desired the $M^2$ value. Once the laser system being analysed is adjusted so as to attempt improve the corresponding the $M^2$ value then a full scan is again required to see if the $M^2$ value has improved or deteriorated. It will be obvious to the skilled reader that repeating these steps results in an overall process that can be very time consuming.

Secondly, in order to achieve accurate results it is necessary to align the beam profiler's optical axis 9 with that of the laser field to be analysed. This requires a significant degree of skill and effort on the part of the operator.

Another significant disadvantage of this profiler 4 is the fact that in order to operate correctly the incident field 3 to be analysed must remain constant over the time that it takes to make a single scan of the field 3, otherwise spurious results will occur. The rate of drum rotation and the detector response time limits the system to measuring beams that are either true continuous wave (CW), or pulsed at repetition rates of greater than 10 MHz.

An alternative beam profiler 10 design known in the art for measuring the $M^2$ value of the output field of a laser 3 is present schematically in FIG. 3. This apparatus again comprises a focussing lens assembly 11 employed to create an artificial waist $d_0$ within the optical field 3 to be measured. However, unlike the previously described system 4 the focussing lens assembly 11 is not translated along the propagation axis 12 of the optical field 3. Instead ten reflective surfaces 13 are located in the optical field 3 to be measured at predetermined positions along the propagation axis 12. These reflective surfaces 13 are employed to form simultaneous images of the optical field 3 at ten locations on a CCD array camera 14. With the data from all ten measurement positions acquired the detected signals are then sent to a computer in order to calculate the desired beam parameters e.g. the $M^2$ value.

The beam profiler 10 exhibits significantly faster operating times than the beam profiler 4 described with reference to FIG. 2. Furthermore the design is suitable for the measurement of both CW and certain pulsed lasers output fields 3. There are however still a number of disadvantages to the design of the beam profiler 10.

The main disadvantage of such beam profilers 10 resides in the employment of the CCD array camera 14. Typical CCD array cameras 14 are generally expensive components and those commercially available devices are limited in what operating wavelengths they can detect. Furthermore, the costs of these components increases not insignificantly the higher the wavelengths desired to be detected. This makes beam profilers 10 made to such designs expensive to manufacture. In addition, neutral density filters or UV filters are often required to be employed in conjunction with these components in order to reduce the power of the incident laser field 3 and so protect the CCD array camera 14 from accidental damage. This increases the degree of skill and effort required by the operator in order to correctly deploy such beam profilers 10.

It is therefore an object of an aspect of the present invention to obviate or at least mitigate the foregoing disadvantages of the beam profilers known in the art.

SUMMARY OF INVENTION

According to a first aspect of the present invention there is provided an $M^2$ value beam profiler comprising: an optical axis defined by a focussing lens assembly and a detector, wherein the focussing lens acts to create an artificial waist within an optical field propagating along the optical axis; a multiple blade assembly having a first set of blades located at an artificial waist position and a second set of blades longitudinally separated along the optical axis from the artificial waist position, wherein the multiple blade assembly provides a means for selectively passing the blades through the location of the optical axis.

The term blade is employed to refer to any mechanical means capable of preventing the propagation of a beam along the optical axis e.g. by absorbing and or reflecting the optical field of the beam.

Preferably the multiple blade assembly also provides a means for successively passing the blades through the location of the optical axis. In the context of the present application the term successively includes in turn or following in an uninterrupted order.

Most preferably multiple blade assembly comprises ten or more blades longitudinally separated along the length of the assembly.

The ten or more blades may be equally spaced along the length of the assembly.

The multiple blade assembly may comprise a rotatable multiple blade assembly wherein the blades are mounted upon a rotatable shaft. Preferably the rotatable shaft defines an axis of rotation for the rotatable multiple blade assembly.

Most preferably the blades are mounted upon a rotatable shaft such that the blades occupy a unique rotational position.

It is preferable for the rotatable multiple blade assembly to further comprise a reference that provides a means for determining the rotational orientation of the rotatable multiple blade assembly relative to the axis of rotation.

Alternatively the multiple blade assembly comprises a mechanical actuator. In this embodiment the blades are mounted on the mechanical actuator which then selectively passes the blades through the optical axis. The blades may also be successively passed through the optical axis.

According to a second aspect of the present invention there is provided method of profiling an output field from a laser the method comprising
propagating the output field along an optical axis;
focussing the output field to form an artificial waist;
locating a first set of blades at an artificial waist position;
locating a second set of blades longitudinally separated
along the optical axis from the artificial waist position;

measuring the width of the output field at the position of the first and the second set of blades by selectively passing the blades through the optical axis to prevent the propagation of the output field; and employing the measured widths to determine the $M^2$ value of the output field.

Preferably measuring the width of the output field further comprises successively passing the blades through the location of the optical axis.

Preferably measuring the width of the output field comprises measuring the width of the output field at ten or more positions along the optical axis by selectively passing ten or more blades through the optical axis to prevent the propagation of the output field.

Preferably the ten or more blades are equally spaced along the optical axis.

Most preferably the first and second sets of blades are separated by a distance greater than or equal to the Rayleigh length of the output field.

Preferably the first and second sets of blades are passed through the optical axis by rotation of a shaft.

Alternatively the first and second sets of blades are passed through the optical axis by the translational movement of a mechanical actuator.

Optionally the measured widths of the output field are employed to calculate a beam waist $z_0$ value for the output field.

Embodiments of the second aspect of the invention may comprise features to implement the preferred or optional features of the first aspect of the invention or vice versa.

According to a third aspect of the present invention there is provided a beam profiler having an optical axis and comprising a multiple blade assembly having first and second blades longitudinally separated along the length of the assembly wherein the multiple blade assembly provides a means for selectively passing the blades through the location of the optical axis.

Preferably the optical axis is defined by a focussing lens assembly and a detector.

Embodiments of the third aspect of the invention may comprise features to implement the preferred or optional features of the first or second aspects of the invention or vice versa.

According to a fourth aspect of the present invention there is provided method of profiling an output field from a laser the method comprising propagating the output field along an optical axis;

measuring the width of the output field at two or more positions along the optical axis by selectively passing two or more blades through the optical axis to prevent the propagation of the output field; and employing the measured widths to determine one or more parameters of the output field.

Most preferably measured widths of the output field are employed to calculate an $M^2$ value for the output field.

Embodiments of the fourth aspect of the invention may comprise features to implement the preferred or optional features of the first, second or third aspects of the invention or vice versa.

BRIEF DESCRIPTION OF DRAWINGS

Aspects and advantages of the present invention will become apparent upon reading the following detailed description and upon reference to the following drawings in which.

DETAILED DESCRIPTION

Figure 5:
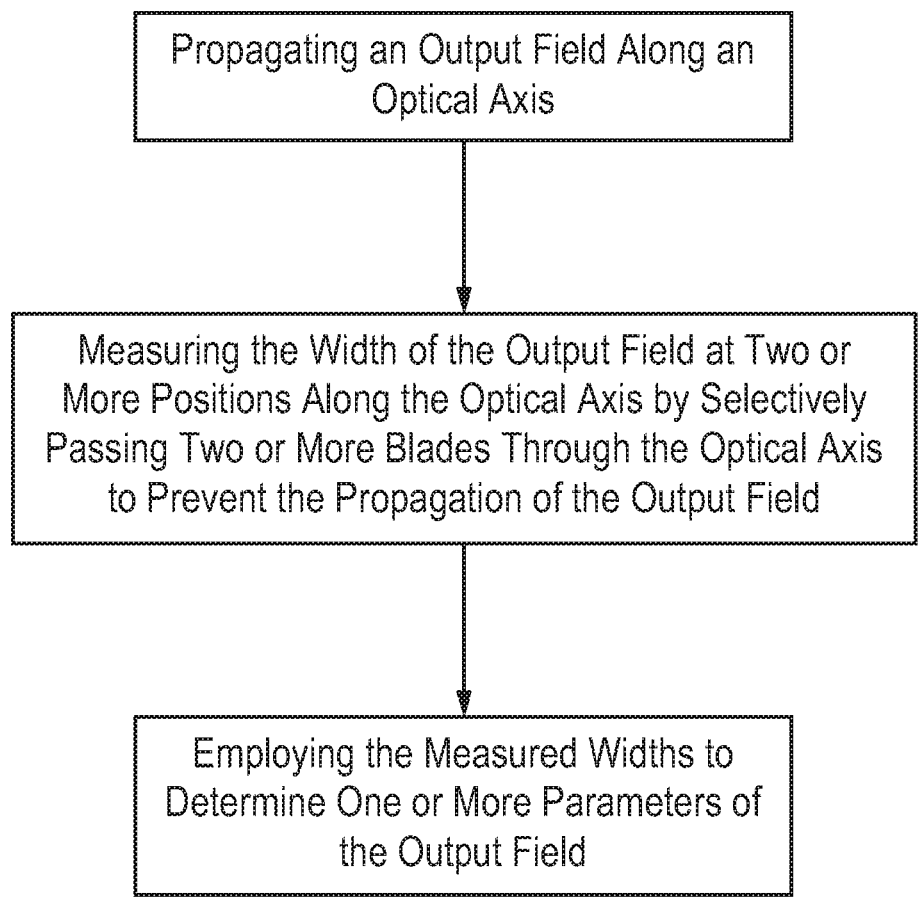
FIG. 5 presents a flow chart of the methodology involved in operating the beam profiler of FIG. 4.
Figure 6:
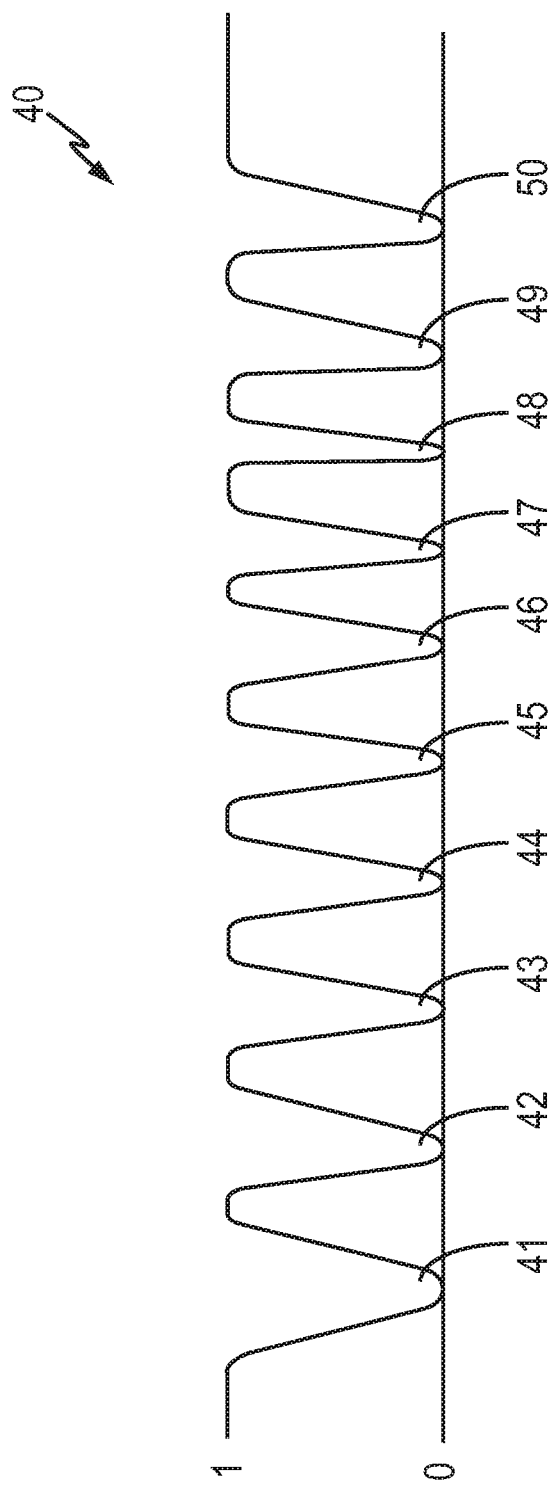
FIG. 6 presents a schematic experimental trace obtained by the beam profiler of FIG. 4.

A beam profiler in accordance with an embodiment of the present invention, and generally depicted by reference numeral 15, will now be described with reference to FIGS. 4 to 6. The beam profiler 15 can be seen to comprise a focussing lens assembly 16, a rotatable multiple blade assembly 17 and a signal detection and processing system 18.

In the presently described embodiment, the signal detection and processing system 18 comprises a detector 19, an oscilloscope 20 connected to the detector 19 and a CPU 21 connected to the oscilloscope 20.

An optical axis 22 of the beam profiler 15 is defined by the location of the focusing lens assembly 16 and the detector 19.

The rotatable multiple blade assembly 17 can be seen to comprise a central shaft 23 that defines an axis of rotation 24 for the assembly 17. The axis of rotation 24 can be seen to be parallel to, but offset form, the optical axis 22. Attached to a proximal end of the shaft 23 is a motor 25 that provide a means for rotating the shaft 23 about the axis of rotation 24.

Moving along the shaft 23 from the proximal end there is located a shaft head 26 upon which is mounted a reference aperture 27. The reference aperture 27 provides the beam profiler 15 with a means for determining the rotational orientation of the rotatable multiple blade assembly 17 relative to the axis of rotation 24.

Also located on the shaft 23 are ten blades, as depicted by reference numerals 28, 29, 30, 31, 32, 33, 34, 35, 36, and 37, respectively. In the embodiment presented in FIG. 4(*a*) the blades 28, 29, 30, 31, 32, 33, 34, 35, 36 and 37 are spaced along the shaft 23. The blades 28, 29, 30, 31, 32, 33, 34, 35, 36 and 37 may be equally spaced along the shaft 23.

Figure 1:
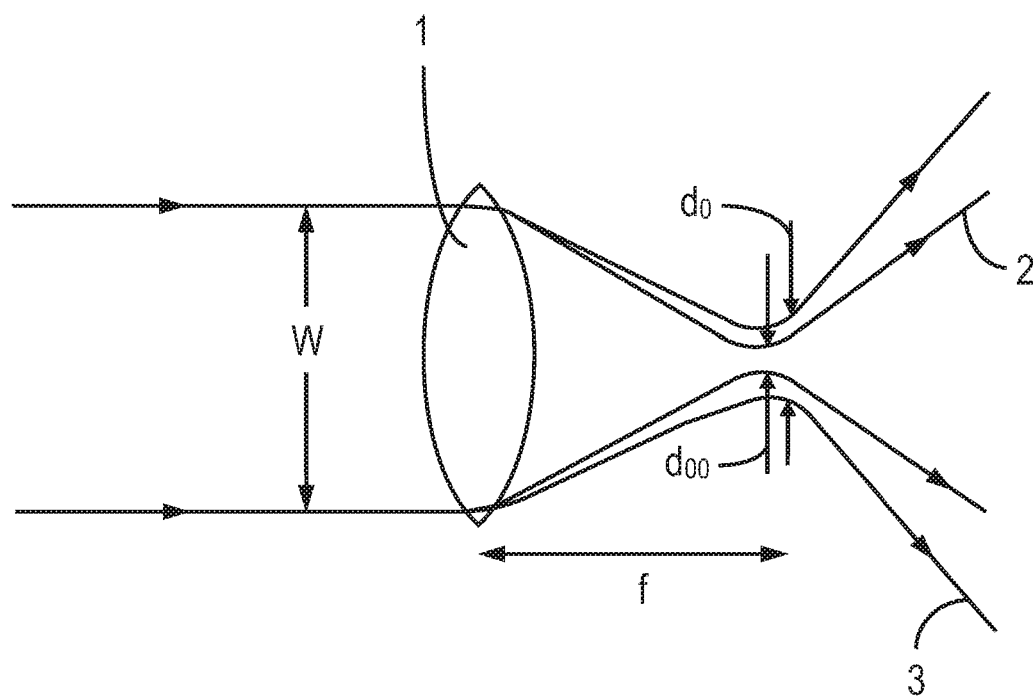
FIG. 1 presents a schematic illustration of the propagation of a uniform Gaussian profiled optical field and a non-uniform Gaussian profiled optical field through a focusing lens.
Figure 2:
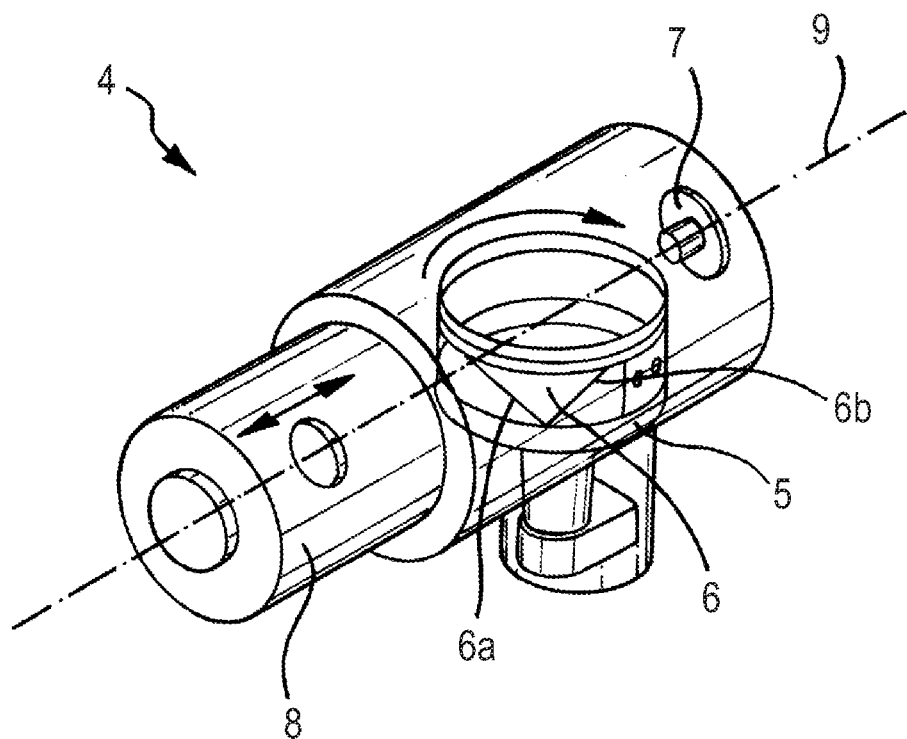
FIG. 2 presents a schematic representation of a beam profiler known in the art.
Figure 3:
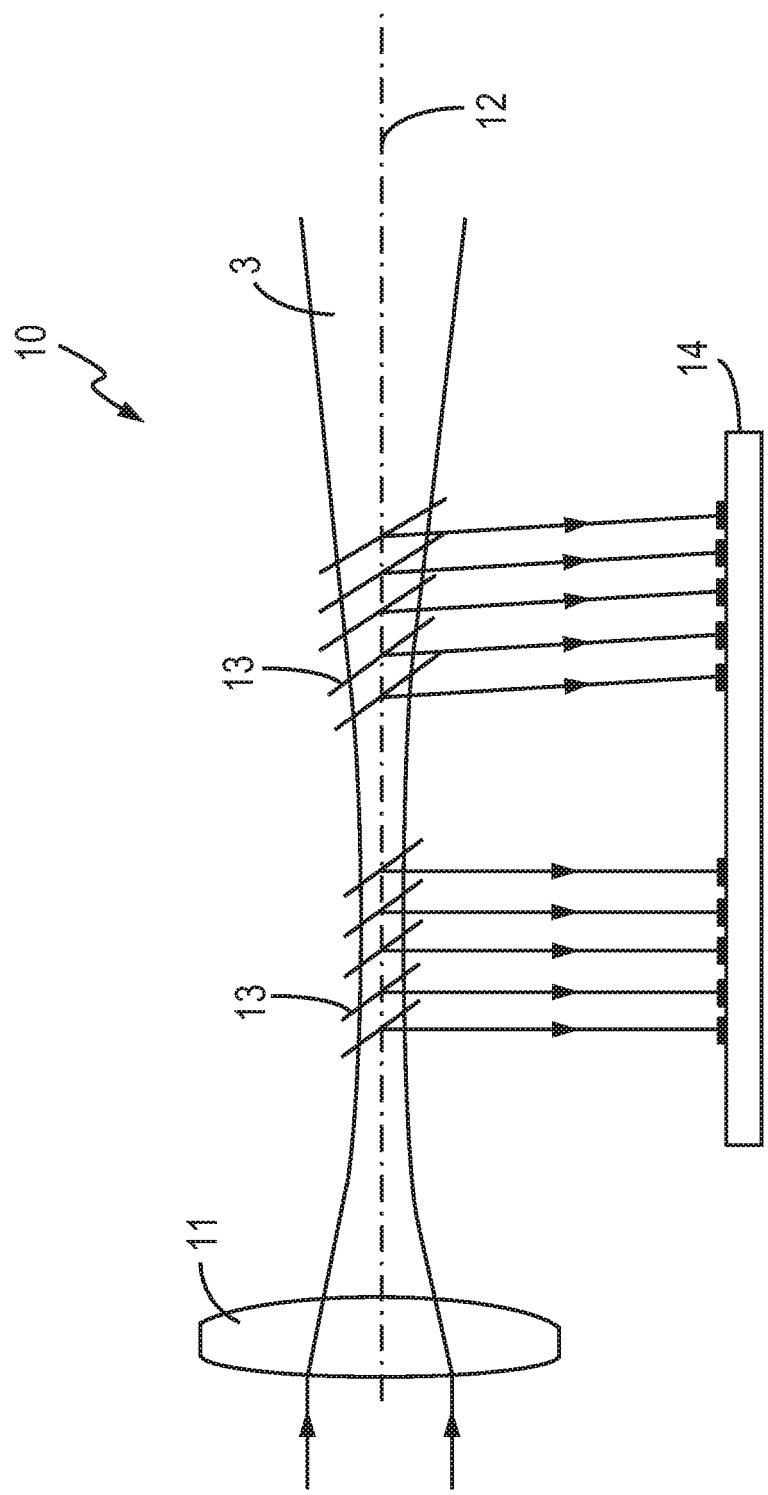
FIG. 3 presents a schematic representation of an alternative beam profiler known in the art.
Figure 4A:
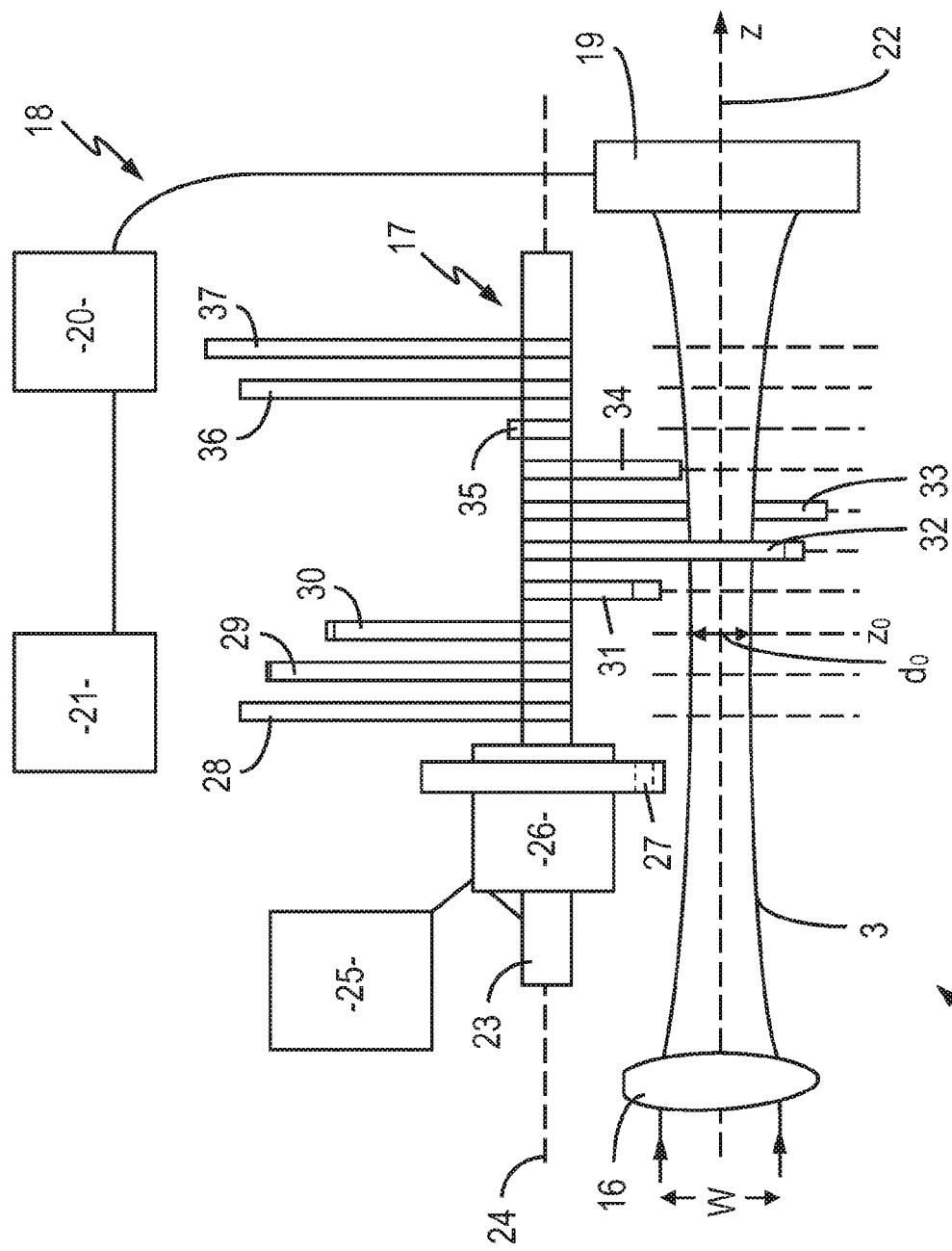
FIG. 4 presents a schematic (a) side view and (b) rear view of a beam profiler in accordance with an embodiment of the present invention.
Figure 4B:
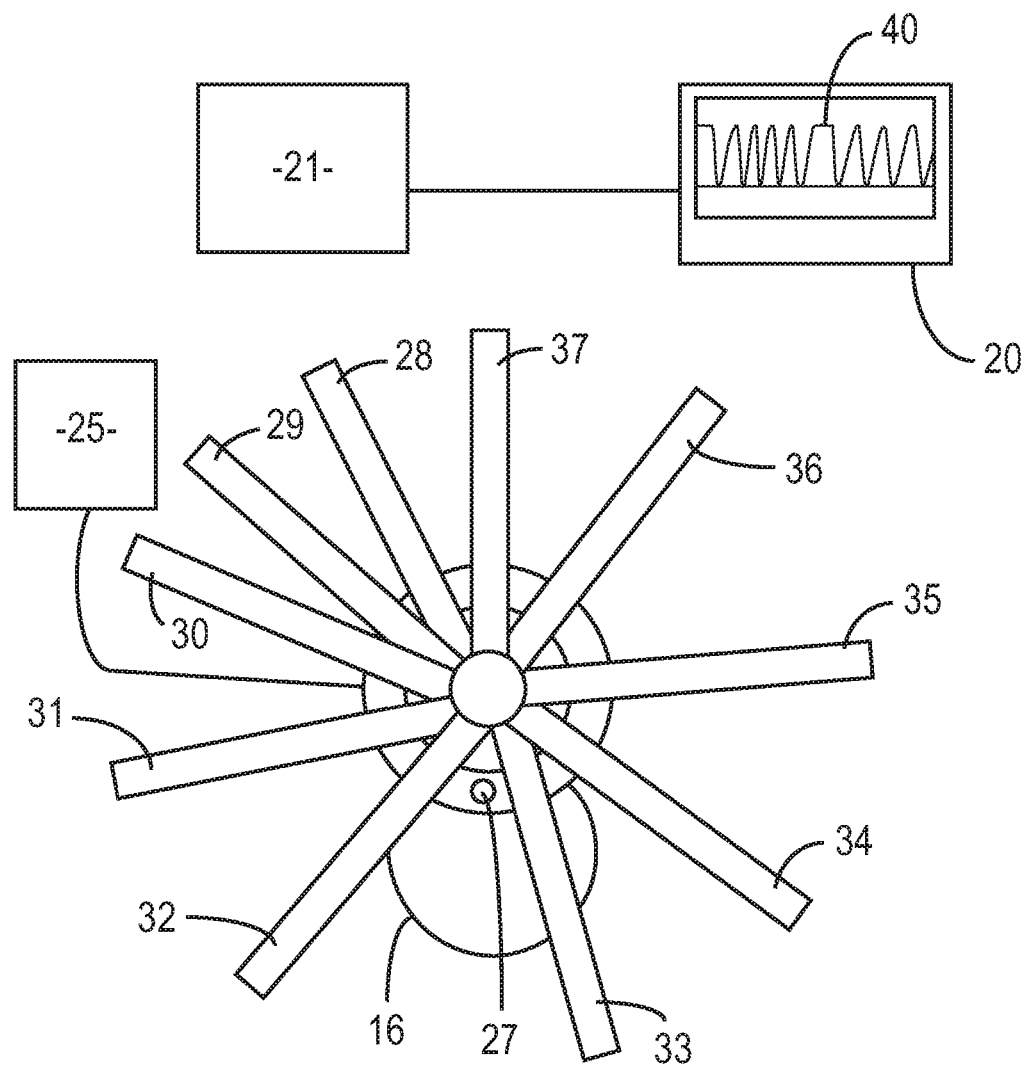

It should be noted that the detector 19 has been omitted from FIG. 4(*b*) for ease of understanding of the orientation of the blades 28, 29, 30, 31, 32, 33, 34, 35, 36 and 37.

The blades 28, 29, 30, 31, 32, 33, 34, 35, 36 and 37 may be equal in length. Irrespective of the actual length of the blades 28, 29, 30, 31, 32, 33, 34, 35, 36 and 37 they each must have a length greater than the offset distance between the axis of rotation 24 and the optical axis 22 so as to allow the beam profiler 15 to function correctly.

As well as the ten blades 28, 29, 30, 31, 32, 33, 34, 35, 36 and 37 being spaced longitudinally along the shaft 23 they each also occupy a unique rotational position about the axis of rotation 24. In the presently described embodiment the ten blades 28, 29, 30, 31, 32, 33, 34, 35, 36 and 37 are arranged to form a helical array from one end of the shaft 23 to the other.

Method of Beam Profiling

The operation of the beam profiler 15 will now be described again with reference to FIGS. 4 to 6. In the first instance the beam profiler 15 is deployed by arranging for the output field 3 of the laser to be analysed to propagate along the optical axis 22. The focussing lens assembly 16 acts to focus an output field 3 having a diameter W down to a waist $d_0$. The output field 3 then propagates along the optical axis 22 so as to be incident on the detector 19.

Deployment of the beam profiler 5 may further comprise adjusting the position of the focusing lens assembly 16 and or the position of one or more of the blades 28, 29, 30, 31, 32, 33, 34, 35, 36 and 37 such that they form a first set of blades 38 located about the position of the waist $z_0$ and a second set of blades 39 positioned at a distance $z_R$ that is greater than or equal to a Rayleigh length of an output field 3.

The motor is then employed to rotate the rotatable multiple blade assembly 17 such that each of the blades 28, 29, 30, 31, 32, 33, 34, 35, 36 and 37 in turn acts to block the output field 3 from reaching the detector 19. A typical experimental trace 40 obtained by the detector 19 and recorded by the oscilloscope 20 is presented in FIG. 6. It can be seen that the transmission profile 40 obtained by the detector 19 comprises ten absorption features 41, 42, 43, 44, 45 and 46, 47, 48, 49, 50 one each corresponding to each of the blades 28, 29, 30, 31, 32, 33, 34, 35, 36 and 37 passing through the output field 3. The width of each absorption feature 41, 42, 43, 44, 45, 46, 47, 48, 49 and 50 is directly related to the width of the of the output field 3 at the position z along the optical axis corresponding to the longitudinal position of the corresponding blade 28, 29, 30, 31, 32, 33, 34, 35, 36 and 37.

In order to obtain the experimental trace it is necessary for the response speed of the detector 19 to be correlated with the speed of rotation of the rotatable multiple blade assembly 17. Apart from this criterion there is a large flexibility in the choice of detector 19 employed by the signal and detection processing system 18 since all that is required is for the detector 19 to be capable of measuring the presence and absence of the output field as dictated by the rotational position of the blades 28, 29, 30, 31, 32, 33, 34, 35, 36 and 37. Indeed a thermal detector could be employed if the speed of rotation of the rotatable multiple blade assembly 17 were slowed to an appropriate value to correlate with its response speed. This flexibility of the choice of detectors means the beam profiler 15 can operate over a greater range of the electromagnetic spectrum e.g. from the ultraviolet region through to the terahertz region, although this may require the use of different focusing lens assemblies.

The signal detection and processing system 18 is then employed to determine the widths of the output field 3 at the ten different positions along the optical axis 22. This information can then be used to provide accurate calculations of the $M^2$ value for the output field 3 as well as other beam parameters e.g. the position of the beam waist $z_0$. Preferably these calculations involve employing D4σ values for the width of the output field 3 at the ten different positions along the optical axis 22 and then fitting these measured data points to equation (3) above.

Figure 7:
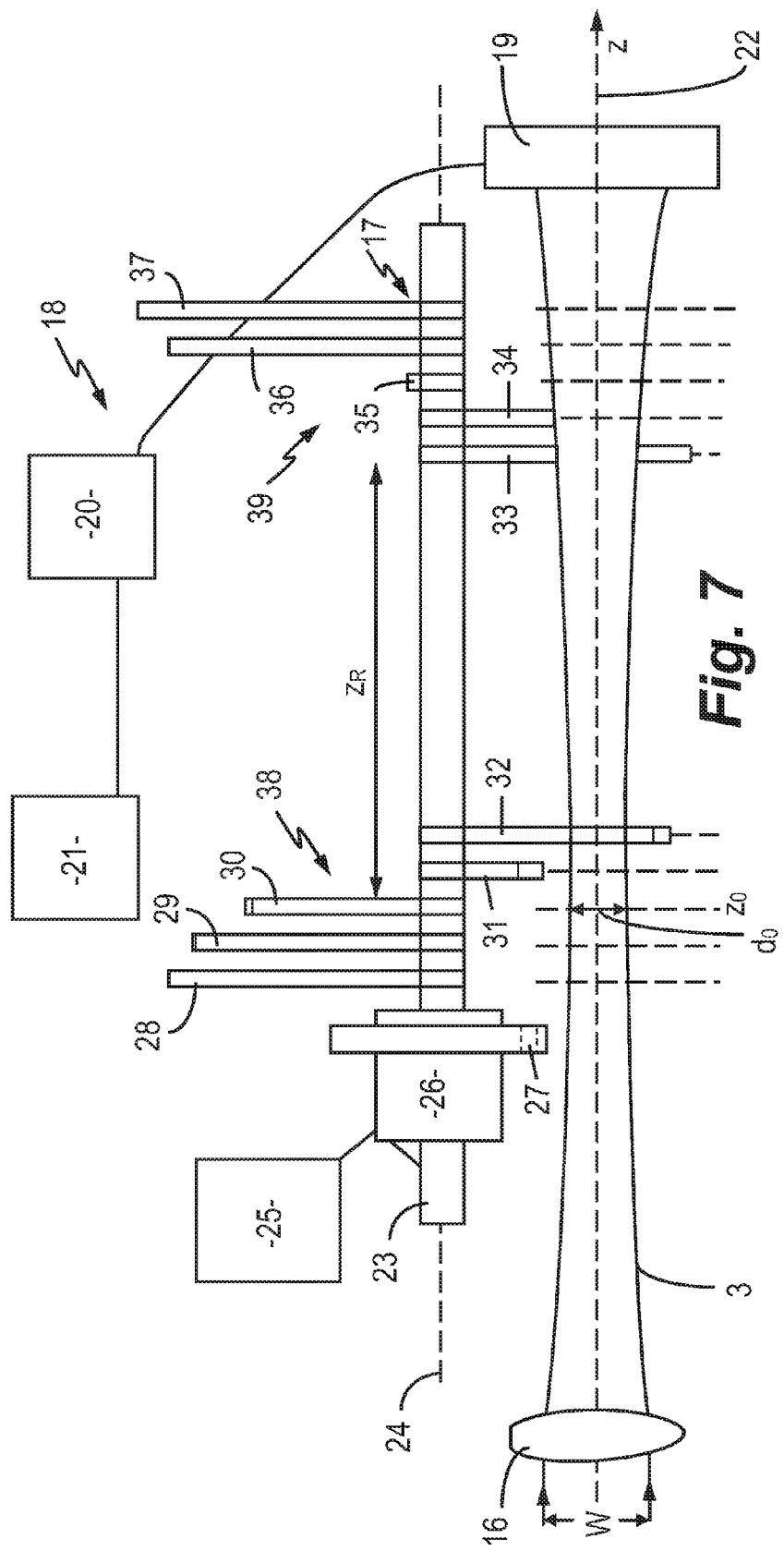
FIG. 7 presents a schematic representation of an alternative multiple blade assembly.

An alternative embodiment of the beam profiler is presented in FIG. 7, as depicted generally by reference numeral 15b. The difference between the beam profiler 15b and that presented in FIG. 4 is that the blades 28, 29, 30, 31, 32, 33, 34, 35, 36 and 37 have been separated into first 38 and second 39 sets of blades. The first 38 and second 39 set of blades are separated by a distance $z_R$ along the length of the shaft 23. It is preferable for the distance $z_R$ to be greater than the Rayleigh length of an output field 3 to be analysed by the beam profiler 15.

It will be appreciated by the skilled reader that the first 38 and second 39 set of blades may comprise more or less than five blades and that each 38 and second 39 need not contain the same number of blades.

Figure 8:
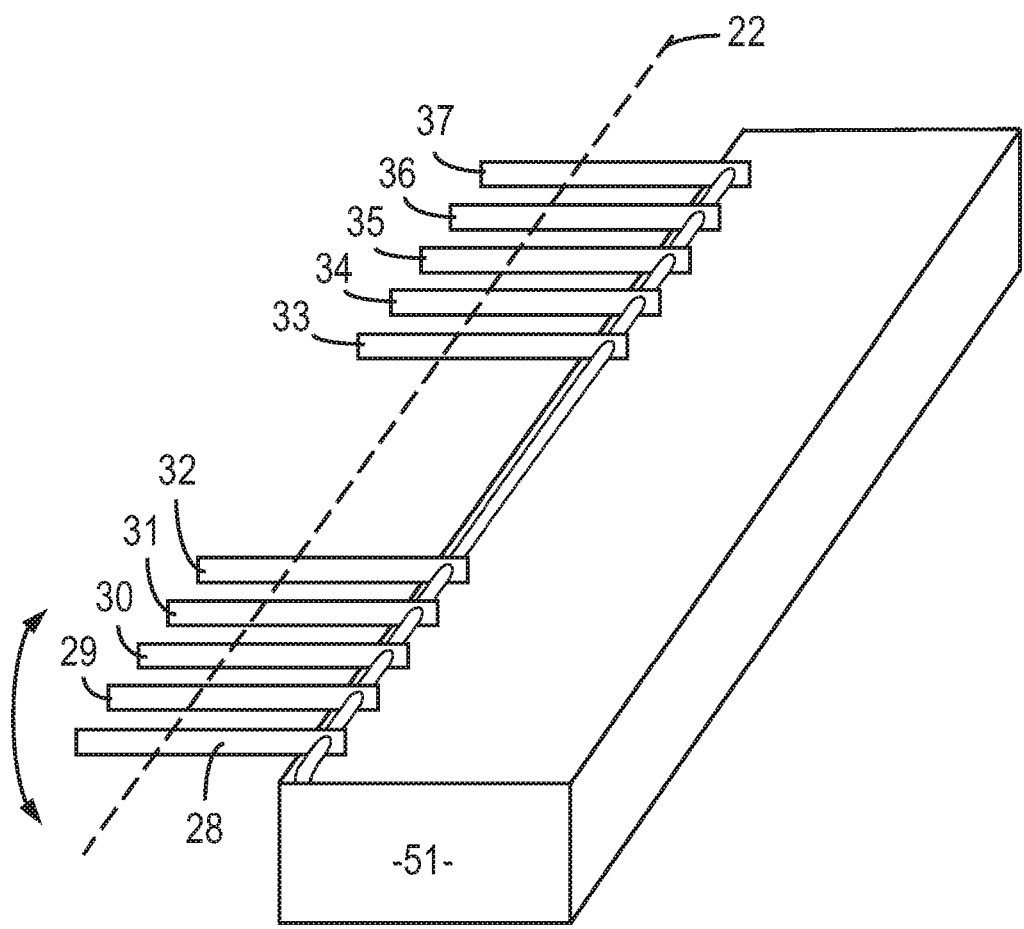
FIG. 8 presents a schematic representation of a further alternative multiple blade assembly.

In a further alternative embodiment presented in FIG. 8 the blades 28, 29, 30, 31, 32, 33, 34, 35, 36 and 37 may be mounted longitudinally along the length of a mechanical actuator 51 instead of on the rotatable shaft 23. The mechanical actuator 51 provides a means for selectively passing each of the blades 28, 29, 30, 31, 32, 33, 34, 35, 36 and 37, preferably successively or in turn, through the location of the optical axis 22 e.g. the blades 28, 29, 30, 31, 32, 33, 34, 35, 36 and 37 are passed in turn down through the location of the optical axis 22 and then in turn back up through the optical axis 22. This process may then be repeated in a cyclic motion so as to replicate the rotation of the blades 28, 29, 30, 31, 32, 33, 34, 35, 36 and 37 of the rotatable multiple blade assembly 17 through the optical axis. In this embodiment it is necessary for the response speed of the detector 19 to be correlated with the period of the blades 28, 29, 30, 31, 32, 33, 34, 35, 36 and 37 passing through the optical axis 22.

It will be appreciated that in all of the above described embodiments the number order of the blades 28, 29, 30, 31, 32, 33, 34, 35, 36 and 37 may be altered. Furthermore, the relative longitudinal and rotational position of the blades 28, 29, 30, 31, 32, 33, 34, 35, 36 and 37 may also be varied. A minimum of two blades are required to exploit the inherent advantages of the invention as described below. However, the upper limit is set be the length of the shaft 23 and the ability to have the blades rotationally separated about the axis of rotation 24. Thus what is important for the operation of the beam profilers 15 and 15b is that the blades 28, 29, 30, 31, 32, 33, 34, 35, 36 and 37 occupy a unique longitudinal position along the shaft 23, a unique rotational position about the axis of rotation 24 and that this information is provided to the signal detection and processing system 18 so as to allow for the analyses of an output field 3 of a laser to be performed.

The beam profilers described above have many advantages over those systems known in the art. In the first instance the beam profiler is significantly quicker than those profilers in the art that employ an automated focusing lens assembly. Results can be achieved in a matter of seconds rather than minutes.

Since the detector is simply required to measure the presence and absence of the output field, as dictated by the rotational position of the blades, then there is no need to employ expensive CCD camera arrays and a reduced requirement to employ power density filters. As a result the beam profiler is significantly cheaper to produce and can be employed over a greater range of wavelengths and powers when compared to profilers known in the art. These reduced operational requirements on the detector also mean that the beam profiler can be employed to analyse CW and pulsed optical fields.

Furthermore, by the appropriate selection of the length of the blades and the offset distance between the optical axis and the axis of rotation the beam profiler can also be employed to operate with a greater range of beam widths than those able to be achieved with the systems known in the art.

The beam profiler is relatively easy to align and so requires less skill and effort on the part of the operator than those systems known in the art.

An $M^2$ value beam profiling apparatus and method is described. The $M^2$ value beam profiler comprises an optical axis defined by a focussing lens assembly and a detector, wherein the focussing lens acts to create an artificial waist within an optical field propagating along the optical axis. The beam profiler also comprises a multiple blade assembly having a first set of blades located at an artificial waist position and a second set of blades longitudinally separated along the optical axis from the artificial waist position. The multiple blade assembly therefore provides a means for selectively passing the blades through the location of the optical axis. Employing these measured widths allows for the $M^2$ value of the optical field to be determined.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An $M^2$ value beam profiler comprising: an optical axis defined by a focussing lens assembly and a detector, wherein the focussing lens acts to create an artificial waist within an optical field propagating along the optical axis; a multiple blade assembly having a first set of blades located at an artificial waist position and a second set of blades longitudinally separated along the optical axis from the artificial waist position, wherein the multiple blade assembly provides a means for selectively passing the blades through the location of the optical axis and comprises ten or more blades that are longitudinally separated along the length of the assembly.

2. An $M^2$ value beam profiler as claimed in claim 1 wherein the multiple blade assembly also provides a means for successively passing the blades through the location of the optical axis.

3. An $M^2$ value beam profiler as claimed in claim 1 wherein the ten or more blades are equally spaced along the length of the assembly.

4. An $M^2$ value beam profiler as claimed in claim 1 wherein the multiple blade assembly comprises a rotatable multiple blade assembly.

5. An $M^2$ value beam profiler as claimed in claim 4 wherein the blades are mounted upon a rotatable shaft.

6. An $M^2$ value beam profiler as claimed in claim 5 wherein the rotatable shaft defines an axis of rotation for the rotatable multiple blade assembly.

7. An $M^2$ value beam profiler as claimed in claim 5 wherein the blades are mounted upon the rotatable shaft and occupy a unique rotational position.

8. An $M^2$ value beam profiler as claimed in claim 6 wherein the rotatable multiple blade assembly further comprises a reference that provides a means for determining the rotational orientation of the rotatable multiple blade assembly relative to the axis of rotation.

9. An $M^2$ value beam profiler as claimed in claim 1 wherein the multiple blade assembly comprises a mechanical actuator.

10. A method of profiling an output field from a laser the method comprising
propagating the output field along an optical axis;
focussing the output field to form an artificial waist;
locating ten or more blades longitudinally separated along the length of the optical axis by locating a first set of blades at an artificial waist position and locating a second set of blades longitudinally separated along the optical axis from the artificial waist position;
measuring the width of the output field at the ten or more positions along the optical axis by selectively passing the ten or more blades through the optical axis to prevent the propagation of the output field; and
employing the measured widths to determine the $M^2$ value of the output field.

11. A method of profiling an output field as claimed in claim 10 wherein measuring the width of the output field further comprises successively passing the blades through the location of the optical axis.

12. A method of profiling an output field as claimed in claim 10 wherein the ten or more blades are equally spaced along the optical axis.

13. A method of profiling an output field as claimed in claim 10 wherein the first and second set of blades are separated by a distance greater than or equal to the Rayleigh length of the output field.

14. A method of profiling an output field as claimed in claim 10 wherein the first and second sets of blades are passed through the optical axis by rotation of a shaft.

15. A method of profiling an output field as claimed in claim 10 wherein the first and second sets of blades are passed through the optical axis by the translational movement of a mechanical actuator.

16. A method of profiling an output field as claimed in claim 10 wherein the measured widths of the output field are employed to calculate a beam waist value for the output field.

* * * * *